(12) United States Patent
Simmerman

(10) Patent No.: US 8,140,235 B2
(45) Date of Patent: Mar. 20, 2012

(54) METHODS AND APPARATUS FOR A BRAKE CONTROLLER AUTOSWITCH

(75) Inventor: Craig T. Simmerman, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 394 days.

(21) Appl. No.: 12/469,537

(22) Filed: May 20, 2009

(65) Prior Publication Data

US 2010/0299034 A1    Nov. 25, 2010

(51) Int. Cl.
*G06F 19/00* (2011.01)
(52) U.S. Cl. .......................................................... 701/70
(58) Field of Classification Search .................. 701/70; 477/182; 301/7, 9.61, 20, 123, 124; 303/7, 303/9.61, 20, 123, 124
See application file for complete search history.

(56) References Cited

U.S. PATENT DOCUMENTS

| | | | | |
|---|---|---|---|---|
| 3,610,699 A | * | 10/1971 | Ladoniczki et al. | 303/7 |
| 4,066,996 A | * | 1/1978 | Davis | 340/431 |
| 6,232,271 B1 | * | 5/2001 | Angermann et al. | 504/282 |
| 6,280,004 B1 | * | 8/2001 | Greaves, Jr. | 303/20 |
| 6,364,432 B1 | * | 4/2002 | Mixon | 303/124 |
| 6,652,038 B1 | * | 11/2003 | Frye | 303/7 |
| 2007/0216217 A1 | * | 9/2007 | Clark et al. | 303/20 |

* cited by examiner

*Primary Examiner* — Paul N Dickson
*Assistant Examiner* — Robert A Coker
(74) *Attorney, Agent, or Firm* — Ingrassia Fisher & Lorenz, P.C.

(57) ABSTRACT

An autoswitching brake controller is provided for a vehicle having a first brake controller system and a second brake controller system. The controller includes an autoswitch relay coupled to the first brake controller system and the second brake controller system. The autoswitch relay is configured to receive an ignition signal from the first brake controller system. When the second brake controller system is connected, and the ignition signal is received, the autoswitch relay autodetects its presence and disables the first brake controller system, at the same time enabling the second brake controller system.

20 Claims, 2 Drawing Sheets

METHODS AND APPARATUS FOR A BRAKE CONTROLLER AUTOSWITCH

TECHNICAL FIELD

The present invention generally relates to automotive control systems, and more particularly relates to integrated brake controller systems used in connection with trailers and the like.

BACKGROUND

Trucks and other automotive vehicles often include some form of brake controller that can be attached to a trailer (or other towed vehicle) to control the brakes in the trailer. In this way, the brakes are applied consistently at both the vehicle and the trailer.

In some cases, the integrated trailer brake controller (ITBC) may have some difficulty controlling certain types of braking systems present in the trailer being towed. That is, in some cases (e.g. when a trailer incorporating electric-over-hydraulic brakes is being towed), it may be necessary to hard-wire an aftermarket brake controller into the vehicle's electro-mechanical braking system. This can be time consuming, and sometimes difficult to reverse.

Accordingly, there is a need for improved brake controllers that allow easy integration with aftermarket brake systems. Other desirable features and characteristics of the present invention will become apparent from the subsequent detailed description and the appended claims, taken in conjunction with the accompanying drawings and the foregoing technical field and background.

BRIEF SUMMARY

An autoswitching brake controller is provided for a vehicle having a first brake controller system and a second brake controller system. In accordance with one embodiment, the controller comprises an autoswitch relay operatively coupled to the first brake controller and the second brake controller system, wherein the autoswitch relay is configured to receive an ignition signal from the first brake controller system. When the second brake controller system is connected, and the ignition signal is received, the autoswitch relay autodetects its presence and disables the first brake controller system, at the same time enabling the second brake controller system.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description. The invention may be described herein in terms of functional and/or logical block components and various processing steps. It should be appreciated that such block components may be realized by any number of hardware, software, and/or firmware components configured to perform the specified functions. For the purposes of conciseness, conventional techniques and systems related to automobile braking systems, electronic components, relays, and the like need not, and are not, described in detail herein.

In general, the present invention relates to an improved automotive brake control system that allows simplified auto-detection and autoswitching between the vehicles default integrated trailer brake control (ITBC) and an aftermarket system.

Figure 1:
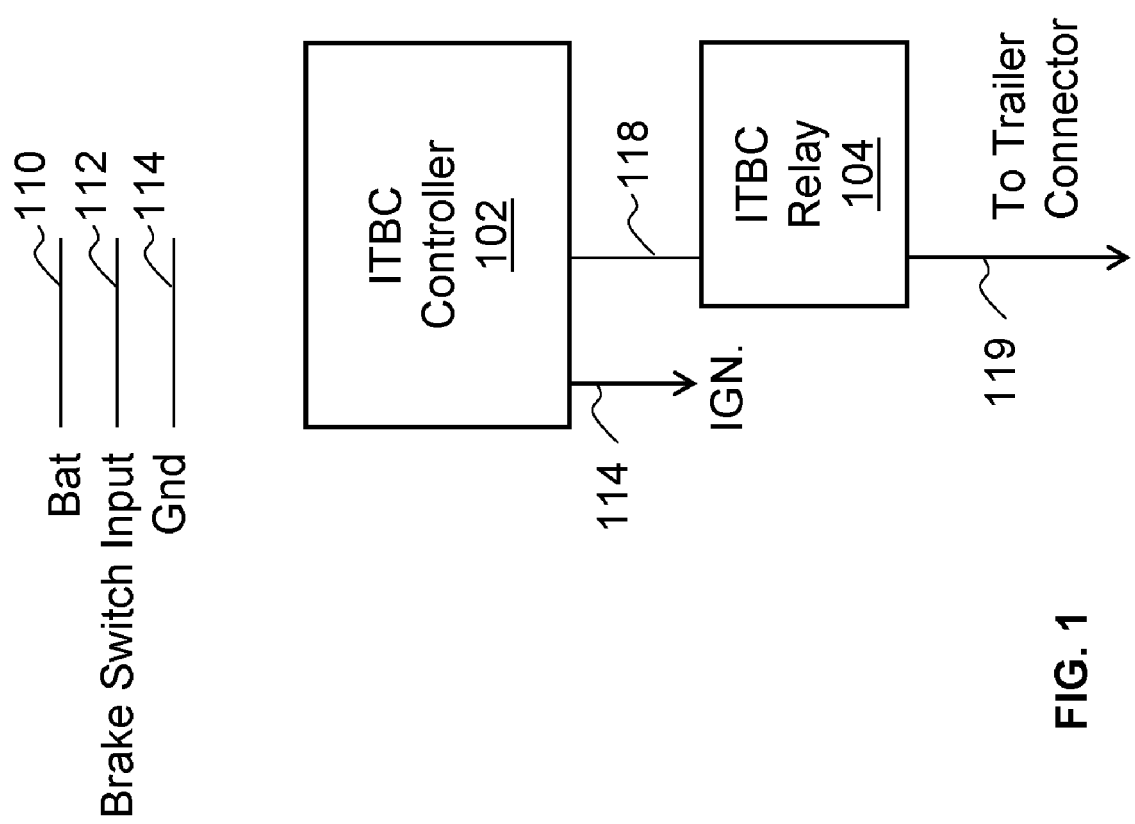
FIG. 1 is a conceptual block diagram of a vehicle environment in which the present invention may be implemented.

FIG. 1 is a conceptual block diagram of an exemplary vehicle environment in which the present invention may be implemented. As shown, the system—prior to installation of an autoswitch relay as described below—generally includes an ITBC controller (or simply "controller") 102 coupled to an ITBC relay (or simply "relay") 104 through any suitable cabling 118. ITBC controller 102 also provides, among other signals, an ignition signal 116 associated with a vehicle ignition event. Controller 102 and relay 104 will occasionally be referred to collectively as an "integrated brake controller system."

ITBC relay 104 is coupled to a traditional trailer connector (not shown), through a standard cable or other wiring system 119. Thus, during operation, ITBC controller 102 instructs ITBC relay 104 to control the brakes on any attached trailer through cable 119.

Figure 2:
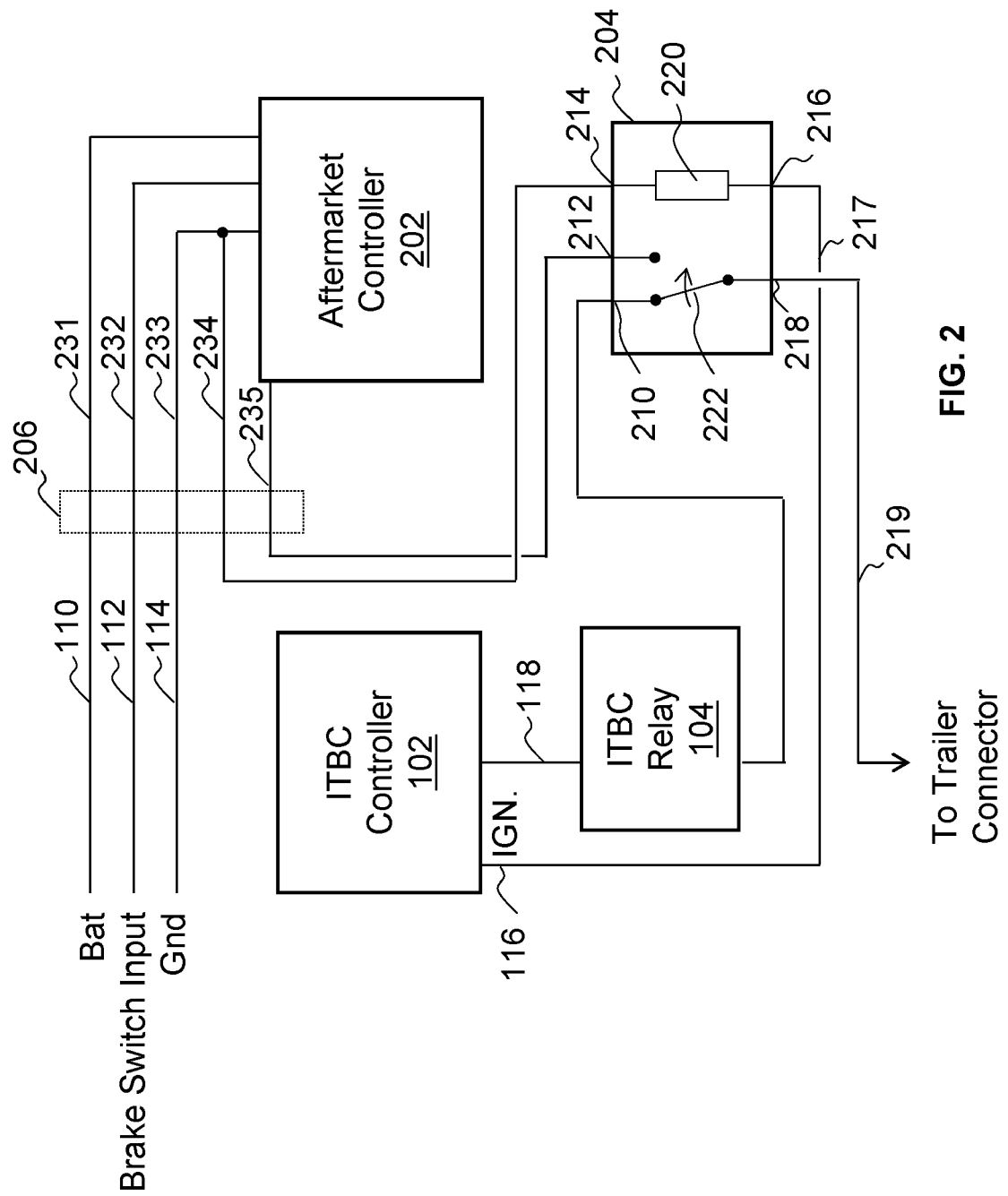
FIG. 2 is a conceptual block diagram of an autoswitch brake controller system in accordance with one embodiment of the invention.

Referring now to FIG. 2, a vehicle environment in accordance with one embodiment of the present invention includes an autoswitch relay 204 and a second brake controller system (e.g. an aftermarket brake controller system 202) integrated into the diagram shown in FIG. 1. Generally, autoswitch relay 204 is operatively coupled to aftermarket brake controller 202 and ITBC controller 102 as illustrated, and is configured to receive and respond to ignition signal 116.

In accordance with one aspect of the invention, autoswitch relay 204 disables the ITBC controller 102 and enables aftermarket brake controller system 202 when an active ignition signal 116 is received by autoswitch relay 204. In the illustrated embodiment, autoswitch relay 204 includes a relay coil 220, as is known in the art, having an active state when ignition signal 116 is present, and an inactive state when ignition signal 116 is not present. Autoswitch relay 204 also includes a switching device 222 (e.g., a two-pole switch as shown) operatively coupled to relay coil 220.

In a particular embodiment, autoswitch relay 204 includes a first node 210 coupled to the integrated brake controller system (102, 104), a second node 212 coupled to the aftermarket brake controller system 202, a third node 214 coupled to a ground node associated with aftermarket brake controller system 202, a fourth node 216 coupled to the integrated brake controller system (102, 104) and configured to receive the ignition signal 116, and a fifth node 218 coupled via cable 219 to the trailer connector. Relay coil 220 is coupled between the third and fourth nodes 214 and 216, and switching device 222 is a two-pole switch selectively coupling the fifth node 218 to the first and second nodes 210 and 212.

To provide a means for easily disconnecting and connecting the various components of the system (i.e., depending upon whether the user wishes to use the aftermarket controller 202 or ITBC controller 102), a connector 206 (e.g., a five-pin connector) may be provided to provide the appropriate electrical connections between the existing wiring with the vehicle and the autoswitching control system.

Thus, as illustrated, a typical vehicle environment might include a battery wire 110 (e.g., 12V), a brake switch input wire 112 (corresponding to a braking event), and a ground wire 114. These wires 110, 112, and 114 may be "blunt cut," bound together, and hidden from view in the passenger cabin of the vehicle. When aftermarket controller 202 and autoswitch relay 204 are subsequently installed, wires 110, 112, and 114 are suitably coupled to connector 206.

Similarly, wires 231, 232, and 233 (corresponding to wires 110, 112, and 114) are coupled to connector 206 to provide communication of these signals with aftermarket controller 202. Wire 234 is a ground wire coupled to wire 233, while wire 235 is also coupled to connector 206, providing a line to node 214 as illustrated.

When connector 206 is disconnected, brake control (to trailer cable 219) is provided in the conventional manner via ITBC controller 102. That is, by virtue of coil 220 being inactive, switch 222 is in its default position connecting nodes 218 and 210. When connector 206 and the various components 202 and 204 are connected as shown, however, the system operates to disable ITBC controller 102 and enable aftermarket controller 202. In particular, when ignition signal 116 is active, current flows through coil 220, since node 214 is grounded via wires 234, 233, and 114. Activation of coil 220 causes switch 222 to connect nodes 218 and 212. This connects trailer connector cable 219 to aftermarket controller 202, which can then take over control of the trailer's braking system. At the same time, ITBC relay 104 (and thus ITBC controller 102) are effectively disabled due to the open circuit between nodes 210 and 218.

The current-handling ability of autoswitch relay 204 may be selected in accordance with any desired design objectives. In one embodiment, for example, autoswitch relay 204 is a standard 30 A relay. The present invention is not so limited, however, and comprehends the use of any component 204 capable of selectively disabling ITBC controller 102 (and enabling controller 202) when aftermarket controller 202 is present and the ignition signal 116 is activated.

Aftermarket controller 202 might include any conventional brake controller, such as electric-over-hydraulic brake controllers or the like. Similarly, ITBC controller 102 and ITBC relay 104 may include any standard brake controller components known in the art.

Thus, what has been described is an improved automotive brake control system that allows simplified autodetection and autoswitching between the vehicles default integrated trailer brake control (ITBC) and an installed aftermarket system. By simply connecting or disconnecting the aftermarket controller, the user can select between the default brake controller and the aftermarket controller, depending upon the nature of the brakes in any attached trailer.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. An autoswitching brake controller for a vehicle, comprising:
    a first brake controller system;
    a second brake controller system; and
    an autoswitch relay operatively coupled to the first brake controller system and to the second brake controller system, the autoswitch relay configured to receive an ignition signal from the first brake controller system, wherein the autoswitch relay disables the first brake controller system and enables the second brake controller system when the ignition signal is received by the autoswitch relay.

2. The autoswitching brake controller of claim 1, wherein the first brake controller system comprises a controller operatively coupled to a relay.

3. The autoswitching brake controller of claim 1, wherein the autoswitch relay comprises:
    a relay coil having an active state when the ignition signal is present, and an inactive state when the ignition signal is not present; and
    a switching device operatively coupled to the relay coil, the second brake controller system, and the first brake controller system.

4. The autoswitching brake controller of claim 3, wherein the autoswitch relay comprises:
    a first node coupled to the first brake controller system;
    a second node coupled to the second brake controller system;
    a third node coupled to a ground node associated with the second brake controller system;
    a fourth node coupled to the first brake controller system and configured to receive the ignition signal therefrom;
    a fifth node coupled to a trailer connector;
    wherein the relay coil is coupled between the third and fourth nodes, and the switching device is a two-pole switch selectively coupling the fifth node to the first and second nodes.

5. The autoswitching brake controller of claim 4, further including a first connector having a first plurality of nodes, including:
    a first connector node coupled to a battery;
    a second connector node coupled to a brake switch input;
    a third connector node coupled to a ground node;
    a fourth connector node coupled to the third node of the autoswitch relay; and
    a fifth connector node coupled to the second node of the autoswitch relay.

6. The autoswitching brake controller of claim 5, further including a second connector configured to releasably couple to the first connector and having a second plurality of nodes corresponding to respective nodes within the first plurality of nodes, the second set of nodes including:
    a first connector node coupled to the second brake controller system;
    a second connector node coupled to the second brake controller system;
    a third connector node coupled to the second brake controller system;
    a fourth connector node coupled to the third connector node; and
    a fifth connector node coupled to the second brake controller system.

7. The autoswitching brake controller of claim 4, wherein the first node of the autoswitch relay is coupled to a relay within the first brake controller system.

8. The autoswitching brake controller of claim 1, wherein the first brake controller system is an integrated brake controller system, and the second break controller system is an aftermarket brake controller system.

9. A method for autoswitching between a first brake controller system and a second brake controller system within a vehicle, the method including:
providing an autoswitch relay communicatively coupled to the second brake controller and the first brake controller system;
receiving, at the autoswitch relay, an ignition signal from the first brake controller system;
disabling the first brake controller system and enabling the second brake controller system when the ignition signal is received.

10. The method of claim 9, wherein the first brake controller system comprises a controller operatively coupled to a relay.

11. The method of claim 9, wherein:
a relay coil disposed within the autoswitch relay enters an active state when the ignition signal is present, and enters an inactive state when the ignition signal is not present.

12. The method of claim 11, wherein
a switching device disposed within the autoswitch relay and coupled to the relay coil such that the switching device performs the disabling step.

13. An autoswitching brake controller system for incorporation into a vehicle with a first brake controller system operatively coupled to a trailer connector, comprising:
a second brake controller system; and
an autoswitch relay coupled to the second brake controller system;
wherein the second brake controller system is configured to removeably couple to a battery node, a brake switch input node, and a ground node associated with the vehicle;
wherein the autoswitch relay is configured to connect between the first brake controller system and the trailer connector, and is configured to receive an ignition signal from the first brake controller system;
further wherein the autoswitch relay is configured to selectively enable and disable the first brake controller system in response to the ignition signal.

14. The autoswitching brake controller of claim 13, wherein the autoswitch relay is further configured to selectively enable the second brake controller system when the first brake controller system is disabled.

15. The autoswitching brake controller of claim 13, wherein the first brake controller system comprises a controller operatively coupled to a relay.

16. The autoswitching brake controller of claim 13, wherein the autoswitch relay comprises:
a relay coil having an active state when the ignition signal is present, and an inactive state when the ignition signal is not present; and
a switching device operatively coupled to the relay coil, the second brake controller system, and the first brake controller system.

17. The autoswitching brake controller of claim 16, wherein the autoswitch relay comprises:
a first node coupled to the first brake controller system;
a second node coupled to the second brake controller system;
a third node coupled to a ground node associated with the second brake controller system;
a fourth node coupled to the first brake controller system and configured to receive the ignition signal therefrom;
a fifth node coupled to a trailer connector;
wherein the relay coil is coupled between the third and fourth nodes, and the switching device is a two-pole switch selectively coupling the fifth node to the first and second nodes.

18. The autoswitching brake controller of claim 17, further including a first connector having a first plurality of nodes, including:
a first connector node coupled to a battery;
a second connector node coupled to a brake switch input;
a third connector node coupled to a ground node;
a fourth connector node coupled to the third node of the autoswitch relay; and
a fifth connector node coupled to the second node of the autoswitch relay.

19. The autoswitching brake controller of claim 18, further including a second connector configured to releasably couple to the first connector and having a second plurality of nodes corresponding to respective nodes within the first plurality of nodes, the second set of nodes including:
a first connector node coupled to the second brake controller system;
a second connector node coupled to the second brake controller system;
a third connector node coupled to the second brake controller system;
a fourth connector node coupled to the third connector node; and
a fifth connector node coupled to the second brake controller system.

20. The autoswitching brake controller of claim 1, wherein the first brake controller system is an integrated brake controller system, and the second brake controller system is an aftermarket brake controller system.

* * * * *